United States Patent
Jesse et al.

(10) Patent No.: US 9,612,257 B1
(45) Date of Patent: Apr. 4, 2017

(54) FULL INFORMATION ACQUISITION IN SCANNING PROBE MICROSCOPY AND SPECTROSCOPY

(71) Applicant: UT-Battelle, LLC, Oak Ridge, TN (US)

(72) Inventors: Stephen Jesse, Knoxville, TN (US); Alex Belianinov, Oak Ridge, TN (US); Sergei V. Kalinin, Knoxville, TN (US); Suhas Somnath, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 15/063,144

(22) Filed: Mar. 7, 2016

(51) Int. Cl.
*G01Q 30/04* (2010.01)
(52) U.S. Cl.
CPC .................................. *G01Q 30/04* (2013.01)
(58) Field of Classification Search
USPC .................................. 850/1, 2, 3, 33; 73/105
See application file for complete search history.

(56) References Cited

U.S. PATENT DOCUMENTS

2002/0062684 A1* 5/2002 Adderton ............... B82Y 35/00
73/105

OTHER PUBLICATIONS

Forchheimer et al., "Model-Based Extraction of Material Properties in Multifrequency Atomic Force Microscopy," Physical Review B 2012, 85 (19), 195449 (7 pp.).
Jesse et al., "The Band Excitation in Method in Scanning Probe Microscopy for Rapid Mapping of Energy Dissipation on the Nanoscale," Nanotechnology 2007, 18 (43), 435503 (32 pp.).
Jesse et al., "Principal Component and Spatial Correlation Analysis of Spectroscopic-Imaging Data in Scanning Probe Microscopy," Nanotechnology 2009, 20 (8), 085714 (7 pp.).
Platz et al., "The Role of Nonlinear Dynamics in Quantitative Atomic Force Microscopy," Nanotechnology 2012, 23 (26), 265705 (25 pp.).
Tetard et al., "New Modes for Subsurface Atomic Force Microscopy Through Nanomechanical Coupling," Nat Nano 2010, 5 (2), 105-109 (5 pp.).

* cited by examiner

*Primary Examiner* — Kiet T Nguyen
(74) *Attorney, Agent, or Firm* — Brinks Gilson & Lione

(57) ABSTRACT

Apparatus and methods are described for scanning probe microscopy and spectroscopy based on acquisition of full probe response. The full probe response contains valuable information about the probe-sample interaction that is lost in traditional scanning probe microscopy and spectroscopy methods. The full probe response is analyzed post data acquisition using fast Fourier transform and adaptive filtering, as well as multivariate analysis. The full response data is further compressed to retain only statistically significant components before being permanently stored.

29 Claims, 11 Drawing Sheets

FULL INFORMATION ACQUISITION IN SCANNING PROBE MICROSCOPY AND SPECTROSCOPY

STATEMENT REGARDING FEDERALLY SPONSORED RESEARCH

This invention was made with United States government support under Contract No. DE-AC05-00OR22725 awarded by the United States Department of Energy. The United States government has certain rights in the invention.

BACKGROUND

Embodiments of the invention relate to apparatus and methods of atomic force microscopy, and spectroscopy, a subset of techniques in scanning probe microscopy.

In conventional Scanning Probe Microscopy ("SPM"), a probe with a sharp tip is rastered over a sample while the topography and material properties of the sample are measured by tracking changes in the changes in the tip-sample interaction. Atomic Force Microscopy ("AFM"), a version of SPM, uses a laser-photodetector system to track changes in the deflection of a cantilever beam with the tip at the free-end to measure the tip-sample interaction. To achieve high signal-to-noise ratio, most popular SPM techniques excite either the probe or the sample (mechanically, electrically, magnetically, etc. or a combination) using a sinusoidal waveform of known amplitude and phase and a narrow-band lock-in amplifier isolates the probe response at a single frequency. The frequency components of the probe response outside the detection bandwidth of the lock-in amplifier are inaccessible and are automatically discarded. In real material applications, however, the probe response is often non-linear in frequency due to complications such as the changing nature of the tip-sample contact, as well as mode couplings, and transients in the response. Thus, the probe response outside the excitation frequency often contains valuable detailed information of the probe-sample interaction. The lock-in amplifier cannot access these frequency components in SPM, as their location in frequency space is unknown a priori, and as such simply ignores them.

Conventional AFM is also used for spectroscopy to study the sample response as a function of one or more parameters. For each spatial location, the excitation waveform is modulated such that each spectroscopic parameter is varied over a desired range. The excitation waveform is applied to the probe or the sample. The probe response, measured by the lock-in amplifier, at the probe excitation frequency as a function of spectroscopic signal parameters constitutes the spectroscopy measurement. Again, useful probe response outside the probe excitation frequency band is permanently lost.

SUMMARY OF THE INVENTION

Various embodiments provide for methods and apparatus of atomic force microscopy and spectroscopy based on full probe response acquisition. The invention is not limited to these embodiments.

In one embodiment, an apparatus includes a probe, a sample, a detector and a data acquisition system. The probe and/or the sample is excited by a time-varying excitation signal at a first frequency band. The detector is coupled to the probe and measures the response signal of the probe at a second frequency band, much broader than the first. Finally, a data acquisition system, coupled to the detector and adapted to sample the response signal, stores the entire sampled response signal of the second frequency band.

In a second embodiment, an apparatus includes a probe, a sample, a detector and a data acquisition system. Here, the probe is excited by a waveform at a first frequency band, adapted to probe a defined area of a sample surface at a plurality of spatial locations. The detector, coupled to the probe, generates one time-segment response signal vector of the probe trajectory at each spatial location within the defined sample area. Each time-segment response signal vector extends in a second, wide, at a second frequency band, much broader than the first. The data acquisition system, coupled to the detector and adapted to sample the response signal, stores the entire sampled response signal of the second frequency band.

In another embodiment, an apparatus includes a probe, a sample, a signal generator, a detector, data acquisition and storage, and a data analyzer system. The probe is adapted to quantify a local property of a sample surface as a function of a spectroscopic parameter. The probe and/or the sample is excited by a signal generator at a first frequency band as well as a predefined frequency and/or bias spectroscopic ranges dictated by the spectroscopic parameter. The detector is coupled to the probe, and generates a response signal of the probe extending into a second, wide, frequency band, wherein at least a portion of the second frequency band much broader than the first. The data acquisition and storage system coupled to the detector and adapted to sample the response signal, stores the entire sampled response signal of the second frequency band, as well as record and store the sampled response signal in the second frequency band. The data analyzer is adapted to extract spectroscopic information as a function of the spectroscopic parameters.

In yet another embodiment, an apparatus, includes a probe, a signal generator, a detector, a data acquisition system, and data storage. The probe is adapted to investigate sample properties locally as a function of a spectroscopic parameter and at a plurality of spatial locations on the sample surface. The signal generator supplies a signal to the probe and/or the sample at a first frequency band as well as a predefined frequency and/or bias spectroscopic ranges dictated by the spectroscopic parameters. The detector is coupled to the probe and generates one time-segment of response signal of the probe at each of the plurality of spatial locations; with each time-segment signal extending a second frequency, much broader than the first. The data acquisition system coupled to the detector and adapted to sample the response signal, stores the entire sampled response signal of the second frequency band. The data storage permanently records the sampled response signal in the second frequency band.

In some embodiments, the above apparatuses may further include a data analyzer that performs multivariate analysis to extract sample parameters in the digitized data, a data filter to preprocess digitized data, and a data compressor to compress the digitized data to retain only the statistically significant signal components.

In one embodiment, a method includes generation of an excitation signal at a first frequency band, and driving a probe and/or the sample with the said excitation signal. The probe response is detected at a second, wide, frequency band at least a portion of which is outside the first frequency band. The detected probe response is sampled at a frequency higher than the probe driving frequency, and the stored response digitized for storage.

In another embodiment, a method includes the steps necessary in generating an excitation signal having a first frequency band and spanning a predefined spectroscopic parameter space range. The scanning probe is driven by the excitation signal, with the detection of the probe response at a second frequency band, much broader than the first. Spectroscopic information as a function of the spectroscopic parameter is then obtained by analyzing the digitized data, stored after sampling the detected probe response at a frequency higher than the probe driving frequency.

In some embodiments, the methods above further include the analysis of the digitized data using multivariate analysis methods and compressing the data to retain only statistically significant components.

These, and other, embodiments of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of an embodiment of the invention without departing from the spirit thereof, and embodiments of the invention include all such substitutions, modifications, additions and/or rearrangements.

BRIEF DESCRIPTION OF THE DRAWINGS

The system and method may be better understood with reference to the following drawings and description. Non-limiting and non-exhaustive embodiments are described with reference to the following drawings. The components in the drawings are not necessarily to scale, emphasis instead being placed upon illustrating the principles of the invention.

DETAILED DESCRIPTION

Embodiments of the invention and the various features and advantageous details thereof are explained more fully with reference to the nonlimiting embodiments that are illustrated in the accompanying drawings and detailed in the following description. Descriptions of well-known starting materials, processing techniques, components and equipment are omitted, so as not to unnecessarily obscure the embodiments of the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

AFM relays the highly localized interaction between a surface and a sharp tip at the end of a vibrating cantilever to macroscopic observables. AFM and SPM imaging provides 2D spatial maps of topographical, mechanical, electrical, magnetic, electrostatic, or electromechanical information about the sample with nanometer scale resolution. AFM may also be extended to a spectroscopy tool by varying some spectroscopic parameter at each spatial point that modifies the local properties in the sample, and results in a 3D, or higher dimensionality dataset.

General-Mode Scanning Probe Microscopy

Figure 1:
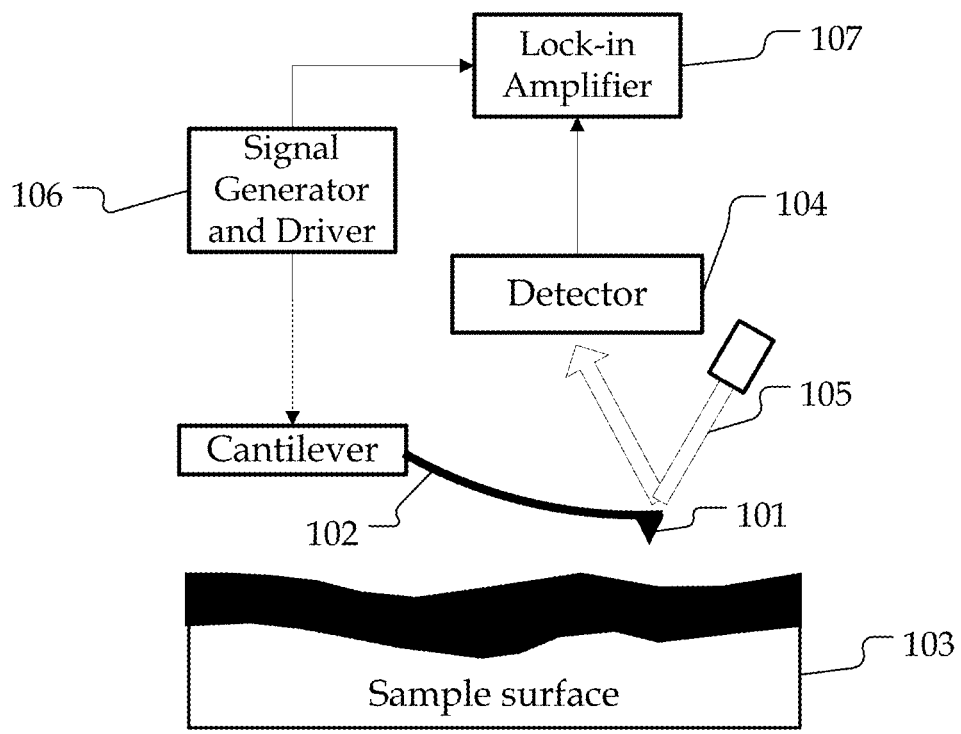
FIG. 1 is an example of conventional modulated Atomic Force Microscopy measurement based on a lock-in amplifier detection scheme.

FIG. 1 shows a conventional AFM-SPM setup. A sharp probe tip 101 is at the end of a cantilever 102. The probe is brought close to a sample 103 mounted on a sample stage (not shown). Interactions between the sample surface and the probe tip lead to flexural and torsional deflections of the cantilever, which can be monitored by various positional or orientational sensors. For example, FIG. 1 shows an optical detector 104 for detecting a laser beam 105 reflected from the cantilever. The generated detector photo-current is directly mappable to the amount of cantilever deflection. Other optical detection methods such as optical interferometry may also be used for detection.

In a traditional AFM, based on periodic-excitation, the cantilever and/or the sample is excited by a sinusoidal signal typically tuned to a specific frequency (typically mechanical resonance) of the cantilever. A signal generator and driver 106, well known in the art, supplies the driving signal. The driving signal may be a voltage applied to the probe and the probe-surface interaction leads to dynamic probe oscillation. The driving signal may alternatively be supplied to a mechanical oscillator coupled to the probe for inducing a probe oscillation and the probe surface interaction leads to dynamic change in the probe oscillation (e.g., amplitude change of the oscillation due to shift of resonant frequency induced by the probe-surface interaction). Other modes of probe excitation are well known in the art. The dynamics of the probe oscillation are monitored by detecting the deflected laser beam 105, by the detector 104.

It is presumed in traditional SPM that the probe-surface interaction is linear in frequency and thus the probe response outside the excitation frequency is considered noise. A lock-in amplifier 107 is therefore used to time-integrate only the signal within this narrow excitation frequency band by using the sinusoidal driving signal as the reference channel for the lock-in. In more advanced traditional SPM based on multiple lock-in amplifiers, the excitation may be based on multiple frequencies, or a frequency band, and data collection may correspondingly be based on multiple lock-in amplifiers.

Figure 2:
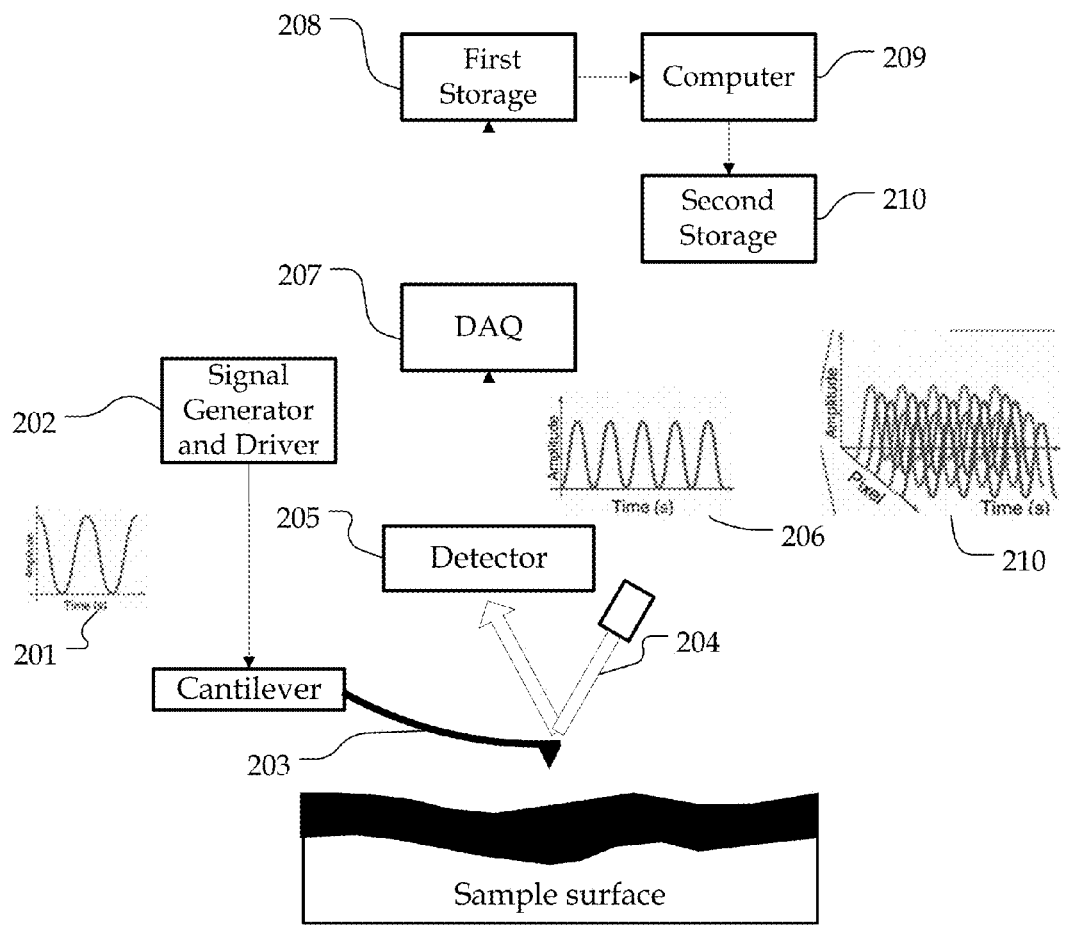
FIG. 2 illustrates an embodiment of the full probe response acquisition (General-mode) scanning probe microscopy.

In one embodiment, hereby referred to as general mode (G-mode) SPM, as shown in FIG. 2, full information of the cantilever motion is acquired followed by subsequent data analysis such as fast Fourier transform (FFT) and multivariate statistical analysis of the full trajectory data set.

In G-mode SPM, similar to a traditional SPM, a driving signal 201, supplied by the signal generator and driver 202, is applied to excite the cantilever and probe 203. The deflected laser beam 204 is detected by a photodetector 205 giving rise to a time-resolved response signal 206. Rather than using a lock-in amplifier, acting as a time integrator and a narrow band filter centered at the driving frequency, the time-resolved full response 206 —representing the full motion of the cantilever, is digitized using a data acquisition system (DAQ) 207 well known by the skilled in the art, such as the NI PXIe-6214 (and other models) DAQ cards manufactured by National Instruments Corporation. Alternatively, a Field Programmable Gate Array (FPGA) can be used instead of the DAQ. In a preferred embodiment, the DAQ samples the full response at a frequency higher than the excitation frequency. For example, the excitation frequency may be set at ~70 KHz and may be near the first vibrational mode of the cantilever, whereas the full response may be sampled at 4 MHz by the DAQ. The full data set digitized by the DAQ is stored in a first storage 208 before being further processed and/or compressed by computer 209. The first storage 208 may be any type of memory well known in the art. It may be volatile or permanent. The compressed data is then stored in a second storage 210. The second storage 210 is preferably a permanent memory. The first 208 and second 210 storage may be a separate, or same physical media.

In one embodiment of the normal G-mode SPM, the sample is stepped through a plurality of spatial points and the full cantilever response is detected and digitized for each spatial point, as shown by 210 of FIG. 2. In another embodiment for microscopy, the sample is traced and retraced in the fast scan axis multiple times at different rates. The tracing rate within each line is preferably slower than the excitation frequency of the cantilever, allowing to record multicycles of probe oscillation within the desired spatial resolution. G-mode data may be collected during either the tracing or retracing direction within each line. Tracing or retracing of the lines may be alternatively interleaved. In a specific embodiment, G-mode data are collected over 256 or 512 lines with 256 pixels per line, giving rise to a typical 4 to 8 GB of G-mode data with an acquisition time of ~18 minutes per image (2 to 4 seconds per line). The full data set is severed into time segments with each segment representing full response data for an effective pixel of the sample surface.

While FIG. 2 shows a single channel of detection, any available degrees of freedom or information stream can be recorded simultaneously on separate channels in G-mode SPM; similar to traditional multi-channel SPM based on a single multi-channel lock-in amplifier. These channels can include the vertical cantilever deflection, lateral cantilever deflection, current, etc.

While the lock-in retains the response at the frequency that the lock-in amplifier is tuned to, G-mode method stores the complete cantilever response for post-processing. The availability of the complete signal provides true and unbiased view of information on the cantilever response at multiple cantilever vibration modes and harmonics of the drive frequency. These signal components contain useful information about the probe-sample interaction, but would be lost in traditional lock-in based SPM. The full data set of the G-mode SPM can be analyzed post data acquisition by, for example, FFT or multivariate statistical analysis by the computer 209 to extract statistically significant contributions to the response signal, organize them in the order of statistical significance, analyze intrinsic correlations, and compress final data for long term storage (if necessary). These multivariate statistical analysis may be based on methods known in the art, such as Principle Component Analysis (PCA), k-means and other clustering algorithms, unmixing algorithms such as Bayesian linear unmixing, and independent component analysis.

In one embodiment, for the post acquisition data analysis by the computer 209 in G-mode SPM, the complete probe response waveform is sliced into sequential time segments. In the simplest case, each segment is selected to match the spatial pixel time; however, this length can be varied to allow multiresolution imaging (referred to as effective pixel). The three-dimensional (3D) data set can be decomposed in ordered statistically significant components through PCA.

Specifically, in PCA defined by $A_i(t_j)=a_{ik}w_k(t_j)$, where $a_{ik} \equiv a_k(x, y)$ are expansion coefficients at each pixel, $A_i(t_j) \equiv A(x, y, t_j)$ is the time dependence of cantilever response at selected spatial pixel, and $t_j$ are the discrete temporal points at which response is measured, a spectroscopic data set of N×M pixels populated by spectra containing P points is represented as a superposition of the eigenvectors $w_j$. The eigenvectors $w_k(t)$ and the corresponding eigenvalues $\lambda_k$ are calculated with a covariance matrix, $C=AA^T$, where A is the matrix of all experimental data points $A_{ij}$, that is, the rows of A correspond to individual grid points (i=1, . . . , N×M), and columns correspond to cantilever deflection over the time of that particular pixel (j=1, . . . , P).

Here the eigenvectors can be either plotted in the time domain, or for convenience transferred into the Fourier domain. Since both PCA and FFT are linear operations, the FFT and PCA (before truncating of expansions) are commutative and hence eigenvectors can be explored in either time or frequency domains. The eigenvectors $w_k(t)$ are orthogonal and are chosen so eigenvalues are placed in descending order, $\lambda_1 > \lambda_2 \ldots$ . Hence, the first eigenvector $w_1(t)$ contains the most information (where information is defined as variance) within the spectral-image data set; the second contains the most informative or varying response after the subtraction of the first one and so on. In this manner, the first p maps, $a_{pk}(x, y)$, contain the majority of information within the 3D data set, while the remaining P-p sets are dominated by noise.

Figure 3:
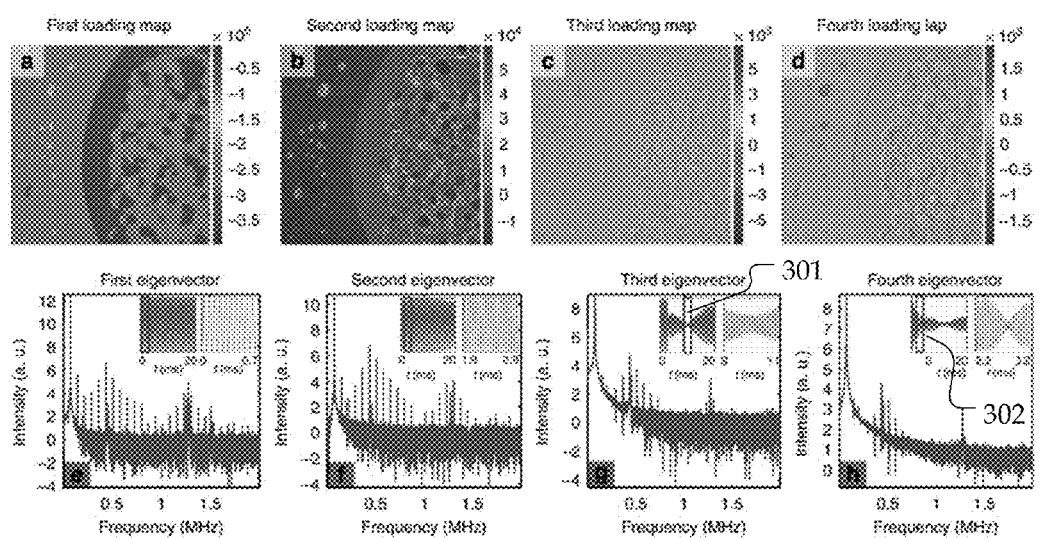
FIG. 3 illustrates results of Principal Component Analysis, for the first four principal components, performed on an exemplary General-mode data set for a test sample.
Figure 4:
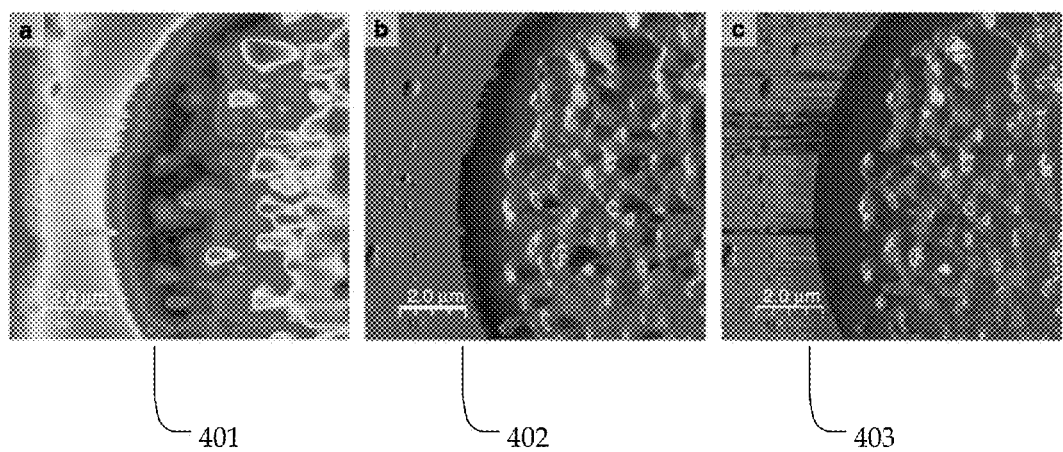
FIG. 4 illustrates topography, amplitude and phase images using conventional, single frequency, lock-in based tapping mode AFM on the same test sample.

The first two eigenvectors of the PCA may be dominated by, for example, the information contained in typical lock-in amplitude and phase signal. Shown in FIG. 3 is an exemplary result of PCA performed on a G-mode data set taken from a spin-coated thin polymer film on mica with the probe driven at a frequency of 73 kHz. The full G-mode data is obtained at a sampling rate of 4 MHz. The top row illustrates loading maps for the first four components. The corresponding eigenvectors in the Fourier domain are shown in the bottom row, with insets being the real space eigenvectors and selected real space zoomed-in regions. The first two PCA components are about five orders of magnitude stronger at the driving frequency of 73 kHz and are dominated by the information contained in the topography 401, amplitude 402 and phase signal 403 at the driving frequency taken by the lock-in amplifier and shown in FIG. 4. Indeed, for the simple harmonic oscillator model the first and second PCA components will be the sinusoidal signals shifted by 90° (since eigenvectors are orthogonal), hence corresponding to the amplitude and phase lock-in signals. Advantageously for G-mode full data acquisition, all other PCA components convey information beyond a single linear harmonic response. For example, the third and fourth eigenvectors in real space, 301 and 302, show characteristics of transient modulation behavior attributed to the transients of cantilever oscillations induced by topography.

In addition, each individual eigenvector and the corresponding loading map further contain information that is typically completely ignored in standard lock-in method. For example, for the G-mode data taken above, the bottom row of FIG. 3 shows that the response at the driving frequency of 73 kHz, second cantilever mode of 435 kHz and third mode of 1.2 MHz are all present in each of the first four eigenvectors. These are visible as a result of thermal excitation and broad-band excitation resulting from tip-surface impact during tapping. In addition, harmonics of the driving frequency are present as well within each eigenvector, along with mixed harmonic components.

Emulation of a Lock-in amplifier response at the driving frequency from post-acquisition processing of the full G-mode data set can be based on simple FFT and filtering at the driving frequency for the probe. For example, the magnitude of the ratio of the FFT of response to the FFT of the input signal at a given frequency (for example, driving frequency) produces cantilever response amplitude and phase images identical to amplitude and phase images in conventional lock-in amplifier-based SPM. Advantageously for G-mode data analysis, emulated lock-in response can be obtained at any other frequencies besides the driving frequency. FIG. 3 shows that the signal at these other frequencies can be rich and informative.

G-mode results may be significantly compressed with lossy compression. By definition, in PCA, the number of eigenvectors has to be the same as the number of input spectra, as the method preserves the data and is reversible and lossless, which in the case of a 256 by 256 image should be $256^2$. In some particular example, since only the first a few hundred or so eigenvectors contain significant information, only those components should be extracted and stored—allowing for low loss, and noise filtered, information compression by, in some cases, almost two orders of magnitude. In other words, a 4 GB temporary file can be stored permanently at 40 MB containing essentially the same information (with noise removed). At the same time, this analysis illustrates that statistically complete unbiased information typically requires a few hundreds of components, not just the first two, which a lock-in amplifier is capable of keeping.

The near loss-less information storage enabled by G-mode data acquisition and analysis allows for detailed exploration of data in frequency and spatial domains post data acquisition. A particular example of such analysis is the ability to achieve multiresolution imaging. Since each spatial pixel is now associated with a frequency response vector, the signal-to-noise (and/or frequency resolution) of the vector can be sacrificed to obtain higher spatial resolution. For example, if the original image is recorded at 256×256 pixels with 16,384 data points sampling the temporal response; this 3D data object can be converted to 256×2,048 pixels with 2,048 point sampling of the temporal response. Besides image clarity and higher quality pictures, this type of custom resolution allows for examining features of interest in an image much more closely and gaining additional insight that can be at far higher resolution. It is therefore possible to push the spatial information of an image to its noise limit, long after the measurement was taken.

Figure 5:
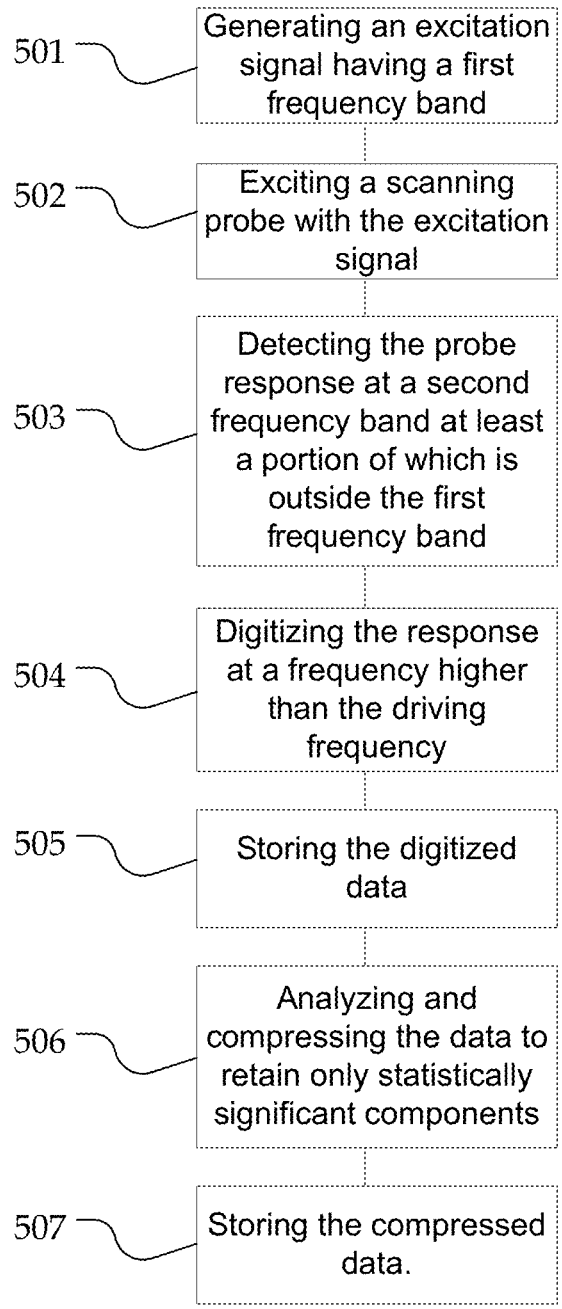
FIG. 5 illustrates an exemplary embodiment of G-mode workflow from signal generation to data analysis.

FIG. 5 shows an embodiment of the method of G-mode data acquisition and analysis described above. In step 501, a driving signal is generated by a signal generator. In step 502, a scanning probe is excited by the driving signal. In step 503, a detector monitors the full deflection response of the probe in a wide frequency band containing the cantilever drive frequency band. In step 504, the signal from the detector is sampled and digitized by a DAQ at a higher frequency than the driving frequency. In step 505, the digitized data is stored in a memory. In step 506, the digitized data is analyzed by a computer and is compressed by keeping only statistically significant information. In step 507, the compressed data is stored.

G-Mode Scanning Probe Spectroscopy

In addition to the main microscopy function of either traditional SPM or G-mode SPM described above, a scanning probe may be used in a spectroscopy mode, or more frequently, in a combination mode of both spectroscopy and microscopy. Here the probe response is measured at each single spatial point of the sample as a function of a spectroscopic parameter that induces property change in the sample, such as probe-surface separation, probe bias, sample bias, magnetic field, heat etc.

In scanning probe microscopy and spectroscopy, (SPMP) based on a traditional method using lock-in amplifier, the probe excitation/deflection measurement and the sample excitation are treated as two separate processes. The probe deflection response is time-integrated and averaged at the probe excitation frequency for each value of the spectroscopic parameter at each spatial point. The G-mode data acquisition followed by FFT and/or multivariate analysis, however, combines this two-step process into a single step and delivers combined microscopy and spectroscopy with extra information, and greatly reduced data acquisition time, as described below.

Figure 6:
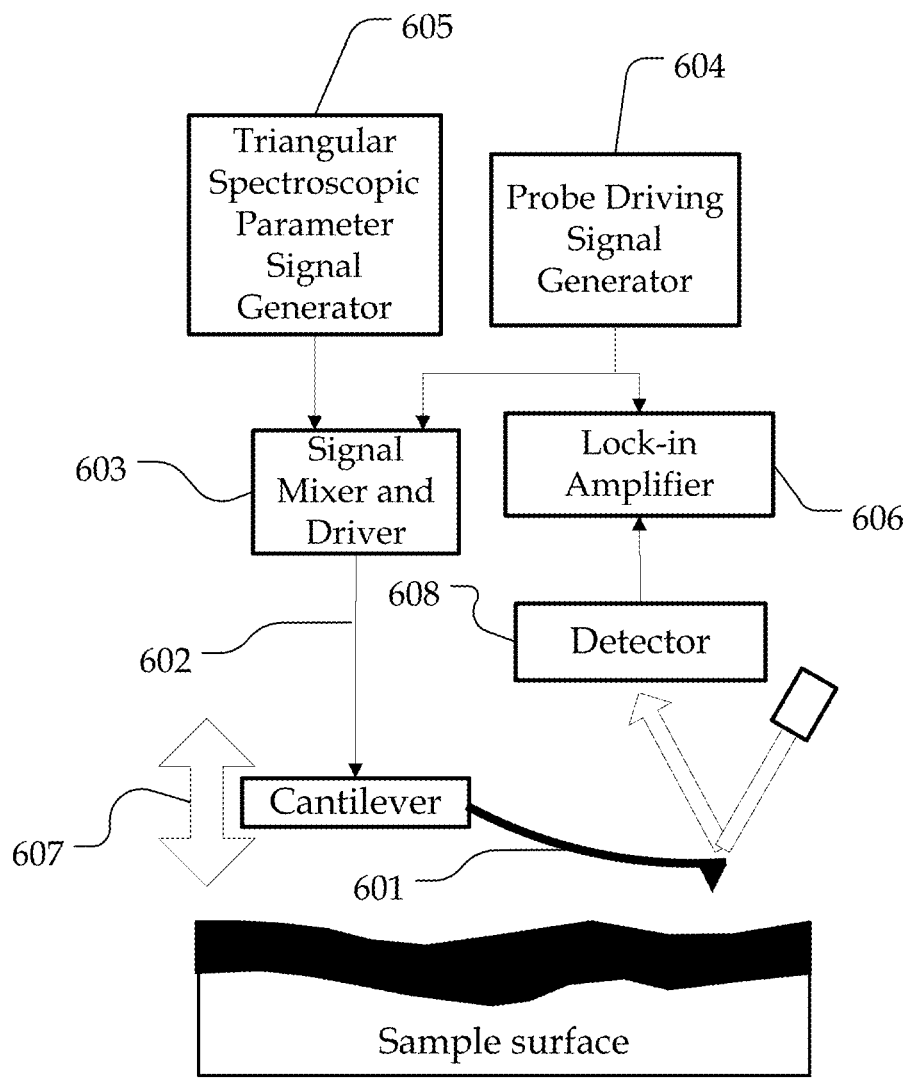
FIG. 6 illustrates a traditional lock-in based AFM spectroscopy.

FIG. 6 shows the conventional lock-in based SPMP (CS) using voltage signals applied to the probe for both deflection measurement, and to induce spectroscopic response of the sample. In particular, an Alternating Current (AC) voltage signal applied to the probe can detect the piezoresponse from the sample and thus provide driving signal for the probe deflection measurement. A Direct Current (DC) voltage superimposed on the AC voltage signal, may induce property changes in the sample, constituting the spectroscopic excitation signal. Those skilled in the art understand that in some other cases, the measurement excitation signal and the spectroscopic excitation signal can be completely separate rather than combined. For example, the spectroscopic excitation signal may be a bias voltage on the probe for excitation of the sample but the measurement signal is a separate voltage waveform supplied to a separate piezo oscillator that induces a mechanical oscillation of the probe.

In FIG. 6, the cantilever and probe 601 is driven by a signal 602 supplied by the signal mixer and driver 603. The mixer and driver 603 mix a single frequency sinusoidal signal from the signal generator 604 and a probe bias from a signal generator 605. The probe deflection response from the detector 608 is time-integrated and averaged by a lock-in amplifier 606 at each probe bias and at each spatial point on the sample. The probe bias signal as the spectroscopic parameter is stepped or tuned between a predefined spectroscopic range for each spatial point on the sample. The sample is scanned to cover a plurality of spatial points. Those skilled in the art understand that the separate signal generators and signal mixer in FIG. 6 may be achieved by a single waveform generator.

In one embodiment, the probe deflection signal may be fed back to a vertical positioner 607 that keeps the probe at a constant height above the sample for the isolation of spectroscopy information. Alternatively, the probe may be kept in a contact mode with the sample. Those skilled in the art understand that the positioner may be used to position the sample rather than the probe for maintaining the constant sample surface-probe distance.

Figure 7:
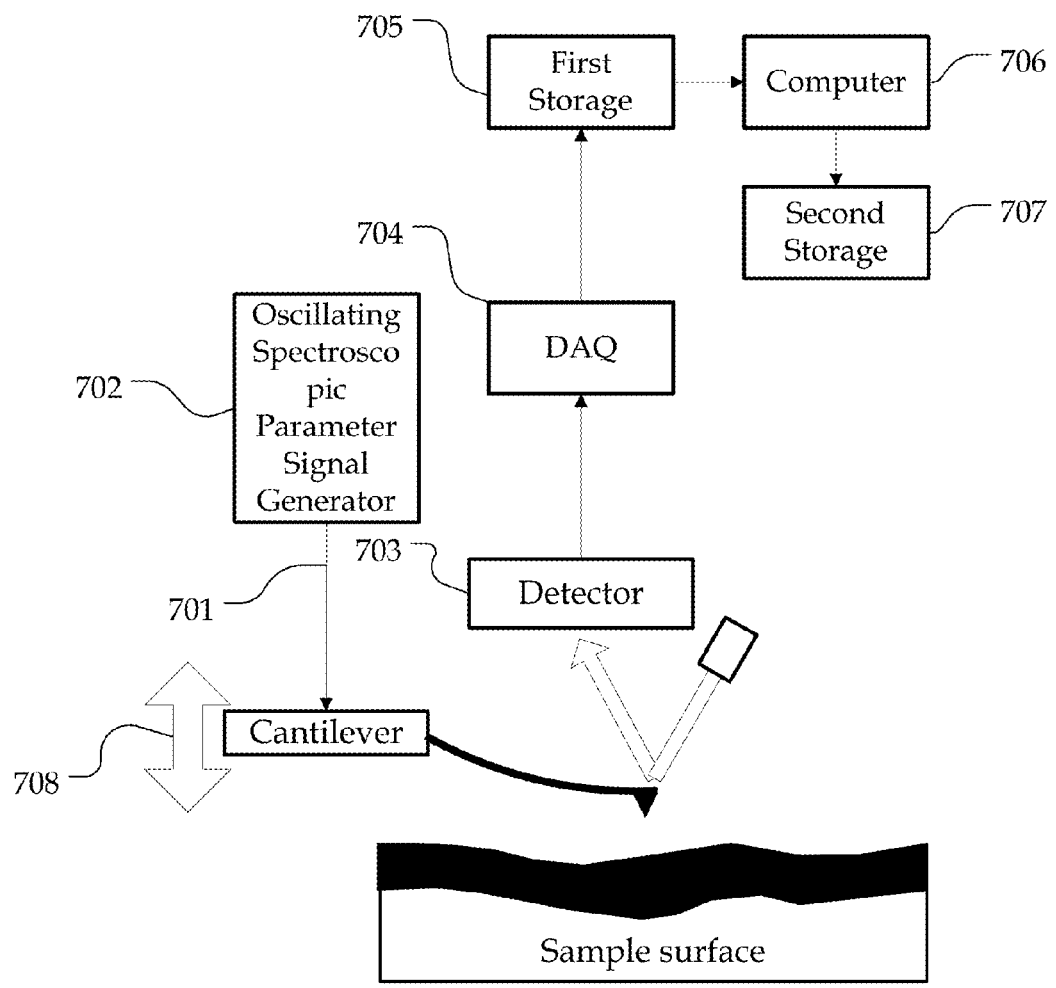
FIG. 7 illustrates an exemplary embodiment of G-mode scanning probe spectroscopy.

In an embodiment for the G-mode SPMP (GS), illustrated in FIG. 7, the probe is driving by one simple signal 701 from a signal generator and driver 702. The driving signal spans the predefined range of the spectroscopic parameter. The probe deflection response from the detector 703 is digitized by the DAQ 704 in the same way as described previously. Those skilled in the art understand that the function of the signal generator and driver 702 may be included in the DAQ 704 which may be programmed to output the desired driving waveform besides sampling and digitizing the full probe deflection signal. The sampling frequency of the DAQ is preferably higher than the probe driving frequency. The full data acquired by the DAQ is first stored in a first storage 705, then processed by computer 706, and finally stored by a second storage 707. The first storage 705 may be any type of memory and need not be a temporary or volatile memory. The second storage 707 is preferably a non-volatile memory for permanent storage. The first and second storage 705 and 707 may be separate memory media, or a single memory medium.

In one embodiment, the probe deflection signal may be fed back to a vertical positioner 708 that keeps the probe at a constant height above the sample for isolation of the spectroscopy information. Alternatively, the probe may be kept in a contact mode with the sample. Those skilled in the art understand that the positioner may be also used to position the sample rather than the probe for maintaining the constant sample surface-probe distance.

Those skilled in the art understand that while FIG. 7 only illustrates the situation where the driving signal for probe deflection measurement and the spectroscopic excitation signal is of the same type and may be superposed before being applied to the probe, the two excitation signals can be separate in GS. For example, the probe may be excited mechanically by a piezo oscillator while the spectroscopic excitation signal, such as a voltage bias, is applied to the probe. The GS methodology functions the same way in that situation so long as the probe excitation oscillation and the oscillating spectroscopic signal are synchronized or in phase.

Figure 8:
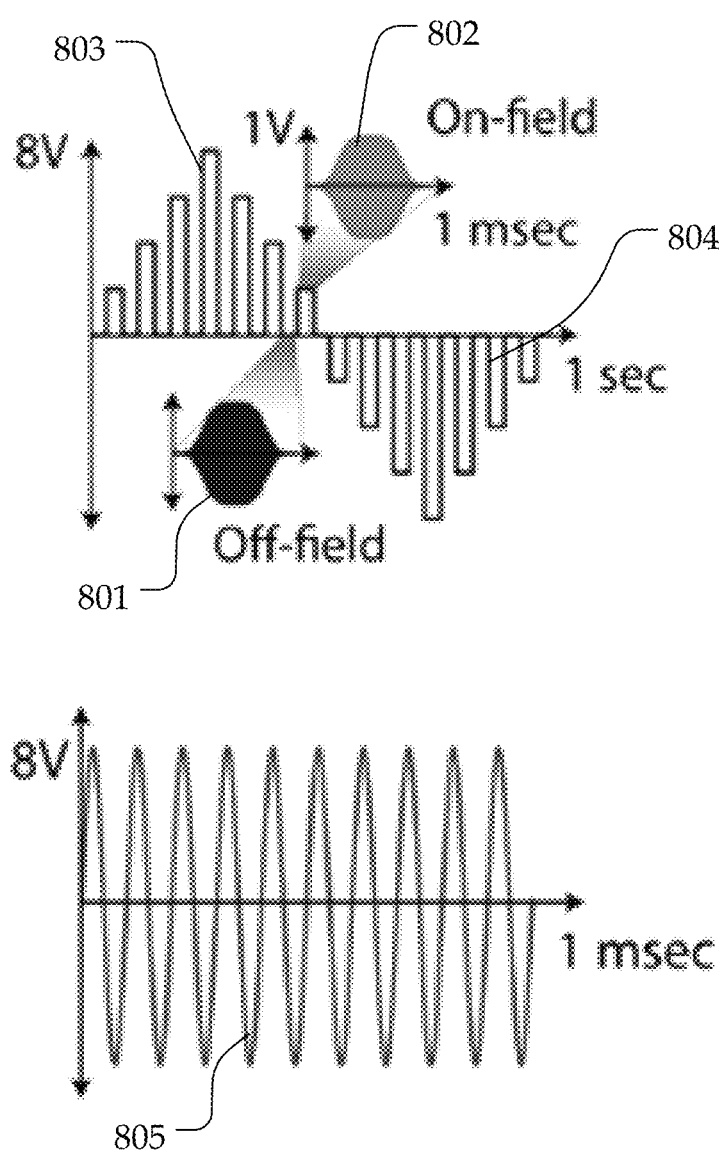
FIG. 8 shows a comparison of the probe excitation signal between an exemplary G-mode and conventional scanning probe spectroscopy.

FIG. 8 illustrates the comparison between the superposed driving signal 602 in CS and the probe driving signal 701 in GS. In an exemplary CS, the driving voltage applied to the probe is set at a probe resonance frequency with a small amplitude for exciting the cantilever oscillation, as shown by 801 and 802. The DC offset of the excitation signal is further modulated by an on-off stepping triangular signal that steps through the desired voltage range for spectroscopy, as shown by 803 and 804. The probe response is detected by a lock-in amplifier at the probe oscillation frequency. The differential of the time-integrated lock-in signal between the on and off DC steps represents the sample response to the spectroscopic stepping parameter.

The GS excitation waveform, however, is typically a sinusoidal signal 805 varying across the desired spectroscopic voltage range and the full probe response is acquired. The GS waveform thus advantageously combines the two components of CS—the slow triangular signal (designed to accomplish spectroscopy) that steps through the spectroscopic parameter and the fast low-amplitude signal at the probe excitation frequency (designed for deflection measurement). Consequently, GS signals have much higher spectroscopic resolution compared to CS where the resolution depends inversely on the number of discrete steps in the parameter sweep signal. GS thus does not suffer from a trade-off between the spectroscopic resolution and the measurement duration.

The amplitude of the GS excitation waveform that spans the range of the desired spectroscopic parameter is not limited to single frequency sinusoidal variation. The exaction waveform 805 could include, but is not limited to single frequency, dual frequency, bimodal, and band excitation. Other more complex excitation modes may also be used in GS.

The GS excitation frequencies can span from a few hundred Hz to values beyond a few MHz depending on the application. Because the full response signal is time-resolved, the excitation frequencies are typically limited by the bandwidths of the photodetector for the deflected laser beam. The excitation duration at each spatial point is determined by the number of desired parameter sweep cycles and the excitation frequency. For example, a typical 10 kHz GS waveform lasting 1 sec results in 10,000 parameter sweep cycles. Thus the GS excitation duration at each spatial point may be much shorter compared to CS which typically provide 0.1-10 cycles of parameter sweep per second as a result of the relatively long lock-in integration time constant for each step of the spectroscopic parameter.

In one embodiment, the DAQ samples data at rates of 1-100 million samples a second. The recorded data is down-sampled to match the rated bandwidth of the signal detector, such as the photodiode at, for example, 2 MHz. Typical sizes of the temporary, raw data files range from 1-4 GB per channel depending on the experimental parameters such as the acquisition time per pixel, data sampling rate, and the number of pixels. Measurements where the pixel time is 1-10 ms can be integrated into a conventional SPM raster scan and the complete scan time ranges from 5-20 minutes. The continuous, smooth, and fast motion of the tip minimizes drift in the measurements, which is very significant in mapping large areas.

Following the acquisition by the DAQ, the full GS data set can be processed by the computer 706 of FIG. 7 using either tools commercially available or customized software. For example, the full data set may be subject to generic FFT or it may be analyzed by more complex multivariate methods based on PCA□□k-means and other clustering algorithms, unmixing algorithms such as Bayesian linear unmixing, or Independent Component Analysis.

The advantage of the post-acquisition data analysis in GS over the traditional lock-in based CS can be illustrated by applying GS to a novel ferroelectric and/or multiferroic material system exhibiting the phenomenon of polarization switching Polarization switching can be studied using Piezoresponse Force Microscopy (PFM), a specific implementation of AFM in which a biased nanoscale tip localizes the electric field within a nanometer scale volume and can measure the local phase or induce local phase transition in the sample.

In PFM, the electromechanical response of the sample to high-frequency electrical excitation (probe excitation) provides measurement about the polarization state of the sample under the tip. These materials may undergo polarization switching induced by external bias voltage. Thus, a DC offset applied to the probe changes the polarization state and may induce a switching of the polarization at some DC offset levels. Such polarization switching underpins a number of applications ranging from non-volatile memories, memories based on tunneling barriers, field effect, and race-track effect, and devices based on domain wall and magnetoelectricity. Switching mechanisms are sensitively affected by local and extended defects, including structural imperfections, dislocations, and inclusions, that serve as a nucleation centers for ferroelectric domains and pinning for moving domain walls. Scanning probe in spectroscopy mode of operation provides the understanding of local switching mechanisms that are of fundamental interest for potential applications. And, GS in particular provides full data set and faster data acquisition for the study of polarization switching.

Figure 9:
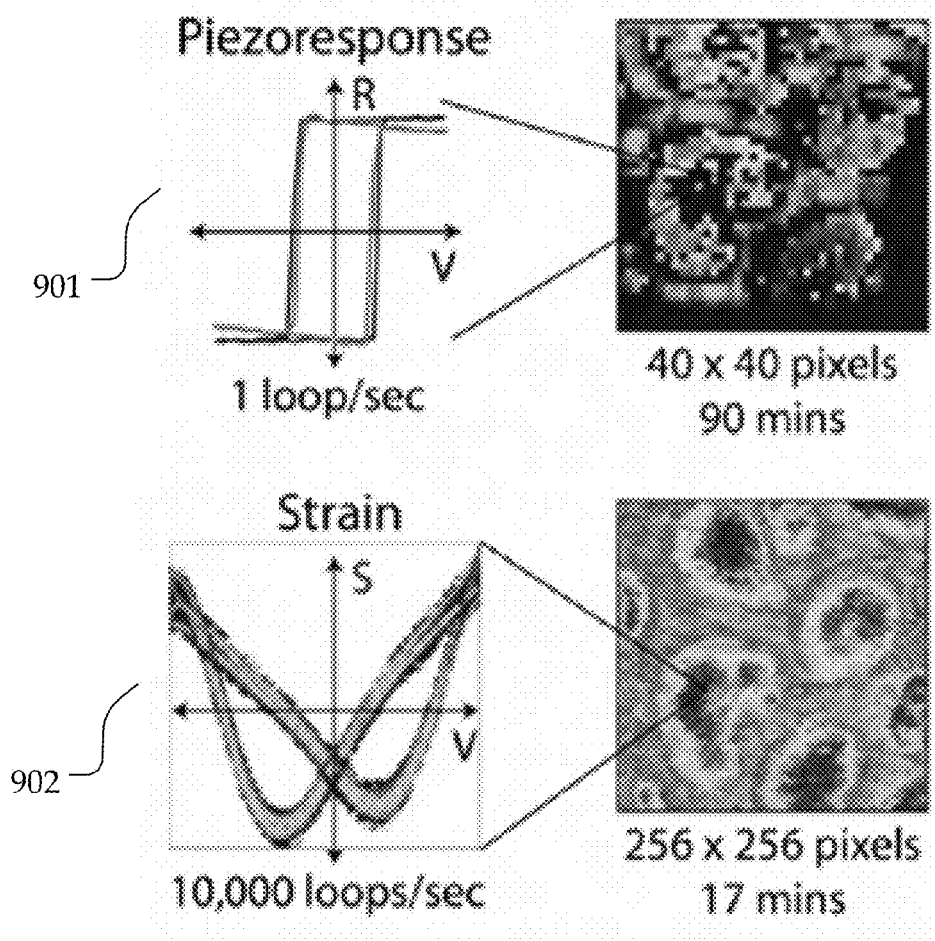
FIG. 9 illustrates conventional and G-mode microscopy and spectroscopy measurement on an exemplary ferroelectric and multiferroic sample.

Exemplary post-acquisition analysis is performed on G-mode data taken from a nanocapacitor sample consisting of (001) Pb(Zr0.2Ti0.8)O3 (PZT) film sandwiched between a SrRuO3/SrTiO3 heterostructure at the bottom and Au/Cu discs of 300 nm diameter, 20 nm height at the top. For traditional CS PFM, a bi-polar triangular waveform (switching bias) in addition to the high-frequency excitation yields a local hysteresis loop at each spatial point, shown by 901 of FIG. 9, representative of the local polarization dynamics. When applying GS to study polarization switching in this material system, a single sinusoidal signal combining the high frequency probe excitation and the switching bias is used to excite the probe in contact with the sample. The full probe response data is measured and processed post data acquisition. For example, following the data acquisition, data-driven filtering routines can be applied to the raw deflection signal to reveal multiple strain loops that are typical of polarization switching, as shown by 902.

Figure 10:
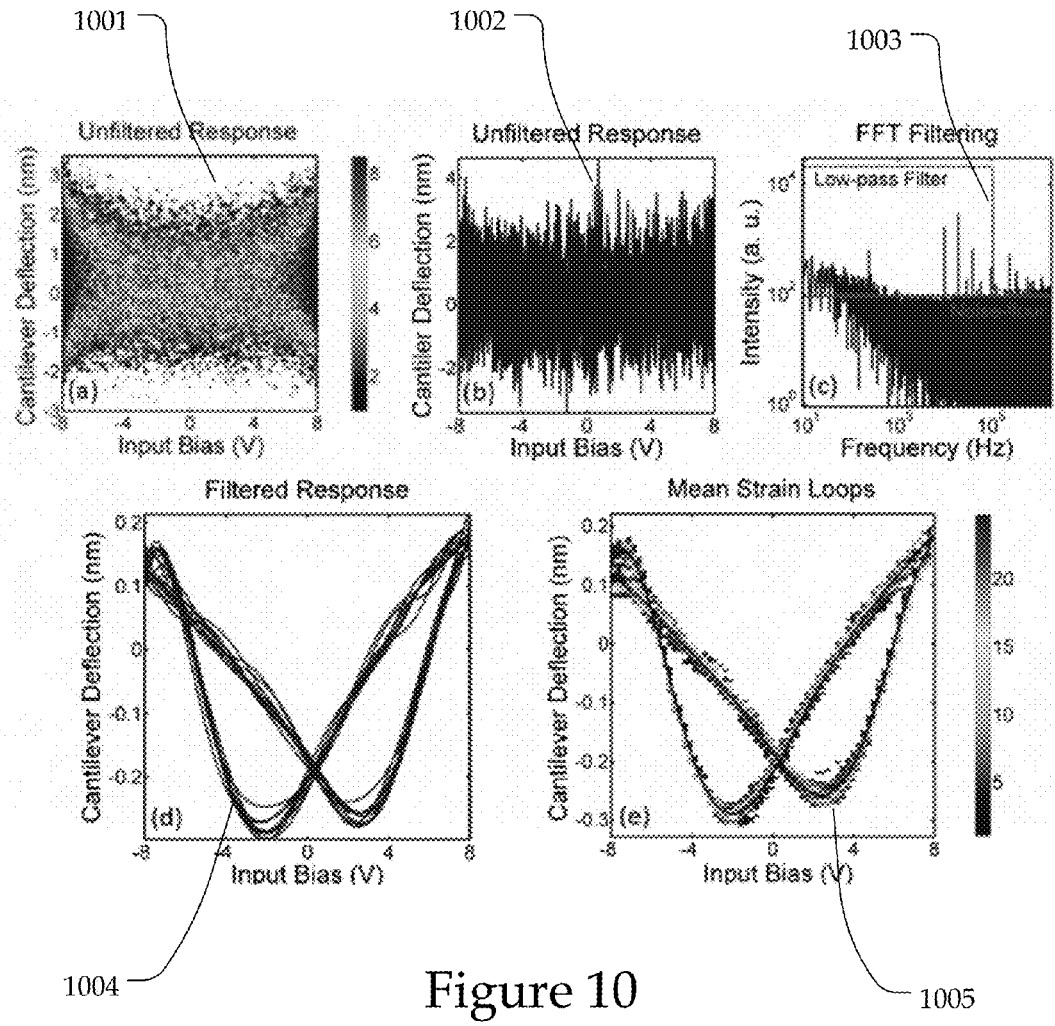
FIG. 10 illustrates an exemplary post-acquisition data analysis in G-mode spectroscopy on an exemplary ferroelectric and multiferroic sample.

The filtering routines are advantageously adaptive and intelligent compared to CS owing to the availability of complete cantilever response. FIG. 10 shows the raw response data 1001 at one particular spatial point containing multiple cycles of the spectroscopic parameter sweeps. The raw data is transformed into Fourier components 1002 using FFT. Advantageously, the data itself is then used to calculate an appropriate noise-floor instead of using a user-defined constant value. Subsequently, the contributions from low frequencies and known noise bands of the microscope are rejected from the signal. A low-pass filter 1003 is applied to reject high frequency noise and the signal below the calculated noise floor is rejected as well. Finally, the data is returned to real-space via an inverse FFT.

The filtered signal reveals multiple strain loops 1004, corresponding to the multiple switching cycles. The drive and response signals are rearranged based on the slope of the drive signal, and maintained in phase; finally a 2D histogram 1005 is constructed of deflection versus voltage. Average strain loops are constructed from the center of mass at each voltage step in the histogram. Such adaptive filtering is necessary for processing the GS data since the tip-sample response is typically distributed over several frequency bands, thus the use of several lock-in amplifiers is not a viable approach. Furthermore, the frequency bands of the tip-sample response can shift and are not known a-priori. Other probe response and measurement channels besides the deflection of the cantilever could also be acquired simultaneously and processed similarly.

Furthermore, the G-mode voltage spectroscopy provides better spatial and voltage resolution, faster data acquisition and consequently is highly resistant to mechanical instability of the microscope. The spatial and voltage resolution of a two-stage CS measurements are controlled by the interplay of several factors. Firstly, the duration necessary for detecting differential signals (~1 ms for lock-in detection) limits the theoretical duration to 11 minutes for acquiring a 100× 100 pixel image with 64 voltage steps. However, instrument communication, file output, and controlling the tip movement practically limit the duration to ~2 hours for the same scan. The nanometer sizes of defects, the sub-10 nanometer resolution of PFM, and the need for several pixels per defect limit the high-resolution scan sizes to a few hundred nanometers on each side. Consequently, these factors limit high-resolution PFM spectroscopic imaging to highly stable instruments only. Increasing the spatial or voltage resolutions dramatically increases the measurement time, which increases sample drift and introduces imaging instabilities.

First order reversal curves (FORC) can be also implemented in the GS above simply by modulating the amplitude of the oscillating excitation waveform. The numerous FORC cycles and high voltage resolution within each cycles facilitates detailed observation of strain loop evolution in the exemplary ferroelectric or multiferroic systems. Upon translating the strain data to polarization, the GS FORC data can also fill a hysterion more completely. As an extension, GS has the potential to rapidly construct Preisach distributions density maps to provide the complete, local hysteresis information about the ferroelectric or multiferroic sample.

Similar to G-mode scanning probe microscopy, the full G-mode spectroscopy data can be analyzed and compressed using multivariate statistical methods such as PCA discussed previously. PCA separates the data into orthogonal components arranged in descending order of statistical weight. The first few components contain the statistically most significant information, while the latter components are typically noise dominated. PCA can also be used for filtering as well as minimizing information loss when compressing the data for permanent storage. For example, from the PCA of the GS data presented above, the first 16 of the 16,384 components contain the majority of the data and the first 64 components may be sufficient to accurately represent and reconstruct the filtered GS data. Thus the typical GS file, of size 2 GB, can be stored permanently as an 8 MB file without much loss in information.

Figure 11:
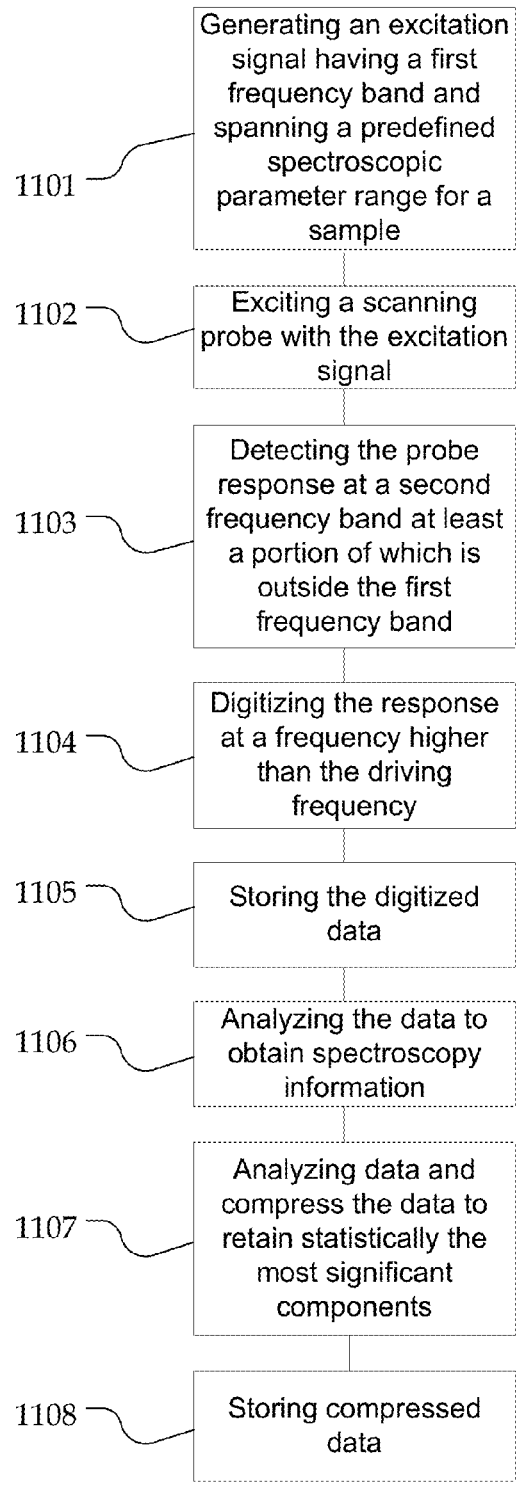
FIG. 11 illustrates an exemplary embodiment of G-mode spectroscopy method.

FIG. 11 illustrates an embodiment of the method of G-mode spectroscopy data acquisition and analysis described above. In step 1101, a driving signal at a first frequency band and amplitude spanning the range of a predefined spectroscopic parameter for a sample is generated by a signal generator. In step 1102, a scanning prove is excited by the driving signal. In step 1103, a detector monitors the full deflection response of the probe in a second frequency band, much broader than the first. In step 1104, the signal from the detector is sampled and digitized by a DAQ at a higher frequency than the driving frequency. In step 1105, the digitized data is stored. In step 1106, the digitized data is analyzed by a computer to provide spectroscopy information for each spatial point on the sample. In step 1107, the data is further analyzed and compressed by only keeping statistically significant information. In step 1108, the compressed data is stored.

While the particular invention has been described with reference to illustrative embodiments, this description is not meant to be limiting. Various modifications of the illustrative embodiments and additional embodiments of the invention, will be apparent to one of ordinary skill in the art from this description. Those skilled in the art will readily recognize that these and various other modifications can be made to the exemplary embodiments, illustrated and described herein, without departing from the spirit and scope of the present invention. It is therefore contemplated that the appended claims will cover any such modifications and alternate embodiments. Certain proportions within the illustrations may be exaggerated, while other proportions may be minimized. Accordingly, the disclosure and the figures are to be regarded as illustrative rather than restrictive.

We claim:

1. An Apparatus, comprising:
   a probe coupled to a sample, wherein the probe or the sample is excited by an excitation signal at a first frequency band;
   a detector coupled to the probe that measures a response signal of the probe,
   a data acquisition system coupled to the detector and adapted to capture the response signal at a sampling frequency higher than the roll-off limit of the detector bandwidth; and
   a data storage system that records the captured information.

2. The Apparatus of claim 1, further comprising a data analyzer adapted to perform multivariate analysis on the recorded data.

3. The apparatus of claim 2, wherein the multivariate analysis is based on principle component analysis.

4. The apparatus of claim 1, further comprising a data compressor that compresses the sampled response by retaining only the statistically significant components.

5. The apparatus of claim 4, further comprising a second data storage that stores the compressed response data.

6. The apparatus of claim 1, further comprising a data analyzer adapted to perform fast Fourier transform on the sampled response.

7. The apparatus of claim 1, wherein the time-varying excitation signal is a single frequency sinusoidal signal.

8. An Apparatus, comprising:
   a probe adapted to probe a defined area of a sample surface wherein the probe or the sample is excited by an excitation signal at a first frequency band;
   a detector coupled to the probe that generates one time-segment of response signal of the probe at each of a plurality of spatial locations within the defined sample area, each time-segment signal extending a second frequency band;
   a data acquisition system coupled to the detector and adapted to capture the response signal at a sampling frequency higher than the roll-off limit of the detector bandwidth; and
   a data storage that records the sampled response signal in the second frequency band.

9. The apparatus of claim 8, further comprising a data analyzer adapted to perform multivariate analysis on the recorded data.

10. The apparatus of claim 9, wherein the multivariate analysis is based on principle component analysis.

11. The apparatus of claim 8, further comprising a data compressor that compresses the sampled response by retaining the most statistically significant components.

12. The apparatus of claim 11, further comprising a second data storage that stores the compressed response.

13. An Apparatus, comprising:
   a probe adapted to probe a local property of a sample surface as a function of a spectroscopic parameter;
   a signal generator that supplies a signal to the probe or the sample at a first frequency band and oscillating across a spectroscopic range predefined for the spectroscopic parameter;
   a detector coupled to the probe that generates a response signal of the probe extending a second frequency band;
   a data acquisition system coupled to the detector and adapted to sample the response signal at a sampling frequency higher than the roll-off limit of the detector bandwidth;
   a data storage that records the sampled response signal in the second frequency band; and
   a data analyzer adapted to extract spectroscopic information as a function of the spectroscopic parameter.

14. The apparatus of claim 13, further comprising a data analyzer adapted to perform multivariate analysis on the recorded data.

15. The apparatus of claim 14, wherein the multivariate analysis is based on principle component analysis.

16. The apparatus of claim 13, further comprising a data compressor that reduces the sampled response by retaining the most statistically significant components.

17. The apparatus of claim 16, further comprising a second data storage that stores the compressed response.

18. An Apparatus, comprising:
   a probe adapted to probe a local property of a sample surface as a function of a spectroscopic parameter and at a plurality of spatial locations on the sample surface;
   a signal generator that supplies a signal to the probe or the sample having a first frequency band and oscillating across a spectroscopic range predefined for the spectroscopic parameter;
   a detector coupled to the probe that generates one time-segment of response signal of the probe at each of the plurality of spatial locations, each time-segment signal extending a second frequency band;
   a data acquisition system coupled to the detector and adapted to capture the response signal at a sampling frequency higher than the roll-off limit of the detector bandwidth; and
   a data storage that records the sampled response signal in the second frequency band.

19. The apparatus of claim 18, further comprising a circuit that feeds back the response signal to a positioner coupled to the probe and adapted to keep the probe at a constant height from the sample surface.

20. The apparatus of claim 18, further comprising a data analyzer adapted to perform multivariate analysis on the recorded data.

21. The apparatus of claim 20, wherein the multivariate analysis is based on principle component analysis.

22. The apparatus of claim 18, further comprising a data compressor that compresses the sampled response by retaining the most statistically significant components.

23. The apparatus of claim 22, further comprising a second data storage that stores the compressed response.

24. A method comprising the steps of:
   generating an excitation signal at a first frequency band;
   exciting a scanning probe with the excitation signal;
   detecting the probe response at a second frequency band;
   digitizing and sampling the detected probe response at a frequency higher than the roll-off limit of the detector bandwidth; and
   storing the digitized response data.

25. The method of claim 24, further comprising the step of analyzing the digitized response data using a multivariate analysis method.

26. The method of claim 25, wherein the multivariate method is based on principle component analysis.

27. The method of claim 24, further comprising the step of compressing the data to retain only statistically significant components and storing the compressed data.

28. A method comprising the steps of:
generating an excitation signal at a first frequency band and spanning a predefined spectroscopic parameter range for a sample;
exciting a scanning probe or the sample with the excitation signal;
detecting the probe response at a second frequency band;
digitizing and sampling the detected probe response at a frequency higher than the roll-off limit of the detector bandwidth;
storing the digitized response data; and
analyzing the digitized data to obtain spectroscopic information as a function of the spectroscopic parameter.

29. The method of claim 28, further comprising the steps of analyzing the digitized data using a multivariate analysis method and compressing the data to retain only statistically significant components.

* * * * *